United States Patent [19]

Wissel et al.

[11] 4,188,585
[45] Feb. 12, 1980

[54] SYNCHRONIZED RECEIVER POWER SYSTEM

[75] Inventors: Frank A. Wissel, Cincinnati, Ohio; Charles A. Bucher, Scottsdale, Ariz.

[73] Assignee: Cincinnati Electronics Corporation, Cincinnati, Ohio

[21] Appl. No.: 887,669

[22] Filed: Mar. 16, 1978

[51] Int. Cl.² .............................................. H04B 1/16
[52] U.S. Cl. ..................................... 325/492; 363/77
[58] Field of Search .................... 325/492, 493, 473; 329/189; 358/190; 328/258, 267; 307/18, 82, 87, 43; 363/77, 39–41

[56] References Cited

U.S. PATENT DOCUMENTS

| 3,286,155 | 11/1966 | Corey | 363/41 |
|---|---|---|---|
| 3,376,490 | 4/1968 | Osugi | 363/41 |
| 3,509,445 | 4/1970 | Chirgwin et al. | 363/41 |
| 3,605,005 | 9/1971 | Stolzy | 363/41 |
| 3,670,234 | 6/1972 | Joyce | 363/56 |
| 3,962,532 | 6/1976 | Aubert et al. | 325/492 |
| 3,974,435 | 8/1976 | Elvin | 363/41 |
| 3,996,581 | 12/1976 | Brodeur et al. | 325/492 |
| 4,030,015 | 6/1977 | Herko et al. | 363/41 |
| 4,034,232 | 7/1977 | La Venture | 307/82 |

Primary Examiner—Robert L. Griffin
Assistant Examiner—Jin F. Ng
Attorney, Agent, or Firm—Lowe, King, Price & Becker

[57] ABSTRACT

A portable radio receiver powered by a battery includes an RF amplifier, an IF amplifier and an audio amplifier powered by a first regulated, switched, DC power converter that derives a first DC voltage. A frequency synthesizer, including varactor diodes, is powered by a second regulated, switched DC power converter that derives a second DC voltage. Digital circuitry included in the synthesizer is powered by opposite polarity, third and fourth power converters. A synchronizing source for switching all of the power converters simultaneously has a fundamental and harmonics outside of the bandpasses of the audio and IF amplifiers to minimize the injection of spurious signals by the power converters into the amplifiers. The synchronizing source is FM modulated by an audio source so that harmonics of the synchronizing source are spread over a predetermined spectrum and the harmonics have noise-like characteristics spread over relatively wide frequency ranges.

18 Claims, 2 Drawing Figures

SYNCHRONIZED RECEIVER POWER SYSTEM

FIELD OF THE INVENTION

The present invention relates generally to battery powered, portable radio receivers and more particularly to such receivers including switched power converters.

BACKGROUND OF THE INVENTION

Portable, sensitive radio receivers of the type frequently employed with "manpack" equipment for military purposes require highly efficient DC to AC to DC power converters. Usually, the efficiency is attained by employing switching converters to supply required DC voltages and currents for receiver components, such as RF, IF, and audio frequency amplifiers, as well as a frequency synthesizer. Because the different receiver components have different power supply requirements, it is necessary to employ several switching converters to derive the required power supply voltages and currents in the most efficient manner.

Switching converters, however, inject noise into the component being powered. The noise occurs at the switching frequency fundamental and harmonics of the switching converter. Sometimes, harmonics as high as the 500th harmonic of the switching frequency fundamental can be injected by the switching converter into the receiver components. If the power supply is switched at a frequency of 15 kHz, the 500th harmonic has a frequency of 7.5 mHz; hence, it is apparent that there is a possibility of interference by the switching harmonics with many standard IF frequencies and lower frequency RF signal inputs.

In addition to the harmonics, there is a problem with intermodulation products when more than one switching converter is employed. This is because the plural switching converters generally operate independently of each other and inject different harmonic waves into the various components driven by them. The harmonic components injected by the different switched power supplies into different non-linear components (e.g., the receiver amplifiers and mixer) are mixed together to form intermodulation components.

It is, accordingly, an object of the present invention to provide a new and improved switched power supply system for a portable, battery operated radio receiver.

Another object of the invention is to reduce the distortion introduced by a plurality of switched power converters for various components of a portable battery powered radio receiver.

Another object of the invention is to provide a new and improved power supply system for a portable, battery operated radio receiver wherein intermodulation due to interference from a plurality of switched converters is minimized.

BRIEF DESCRIPTION OF THE INVENTION

In accordance with one aspect of the invention, a portable radio receiver powered by a battery and including an IF amplifier having a predetermined center frequency and bandpass, as well as circuit means for supplying signals to and responsive to signals derived from the IF amplifier, includes a new improved switched power supply system. In accordance with one aspect of the invention, the power supply means system includes a first battery powered switching converter for deriving a first DC power supply voltage that powers the IF amplifier, and a second battery powered switching converter for deriving a second DC power supply voltage that powers at least some of the circuit means. A source powered by the battery synchronizes the switching of the first and second converters so that both converters are switched at the same time. The synchronizing source has a fundamental and harmonics outside of the bandpasses of the IF amplifier and the circuit means powered by the second power supply to minimize spurious signals injected by the power supply into the IF amplifier and circuit means. Because the switched power converters are simultaneously activated, power supply filtering in the receiver is directed to the switching frequency and harmonics thereof. Because the switched converters are synchronized to a single source, intermodulation products from the several regulators do not occur. In addition, because a single switching center frequency is employed, it can be selected to avoid certain critical frequencies in the receiver spectrum, such as in the bandpass of the IF amplifier.

In accordance with a further feature of the invention, the synchronizing source for the switched converters derives a wave having a frequency spread over a predetermined spectrum so that harmonics of the wave have noise-like characteristics spread over relatively wide frequency ranges. Preferably, such a synchronizing source includes a fixed frequency source that is FM modulated to derive the wave having a frequency spread over the predetermined spectrum. By making the harmonics noise-like, the narrow band energy content of the switching frequency and its harmonics is spread over a relatively wide bandwidth to minimize effective interference between the power supply switching and the signal being handled by the receiver. It is particularly desirable to spread the noise injected by the switched converters of audio, speech responsive receivers, as well as frequency shift key modulation receivers.

It is, accordingly, another object of the invention to provide a new and improved portable, battery powered, sensitive radio receiver employing a switching power converter wherein the energy content of any single switching frequency and its harmonics is relatively low.

A further object of the invention is to provide a portable, battery powered, sensitive radio receiver employing a switching power converter having noise-like harmonics spread over a relatively wide frequency band.

The above and still further objects, features and advantages of the present invention will become apparent upon consideration of the following detailed description of one specific embodiment thereof, especially when taken in conjunction with the accompanying drawing.

DETAILED DESCRIPTION OF THE DRAWING

Figure 1:
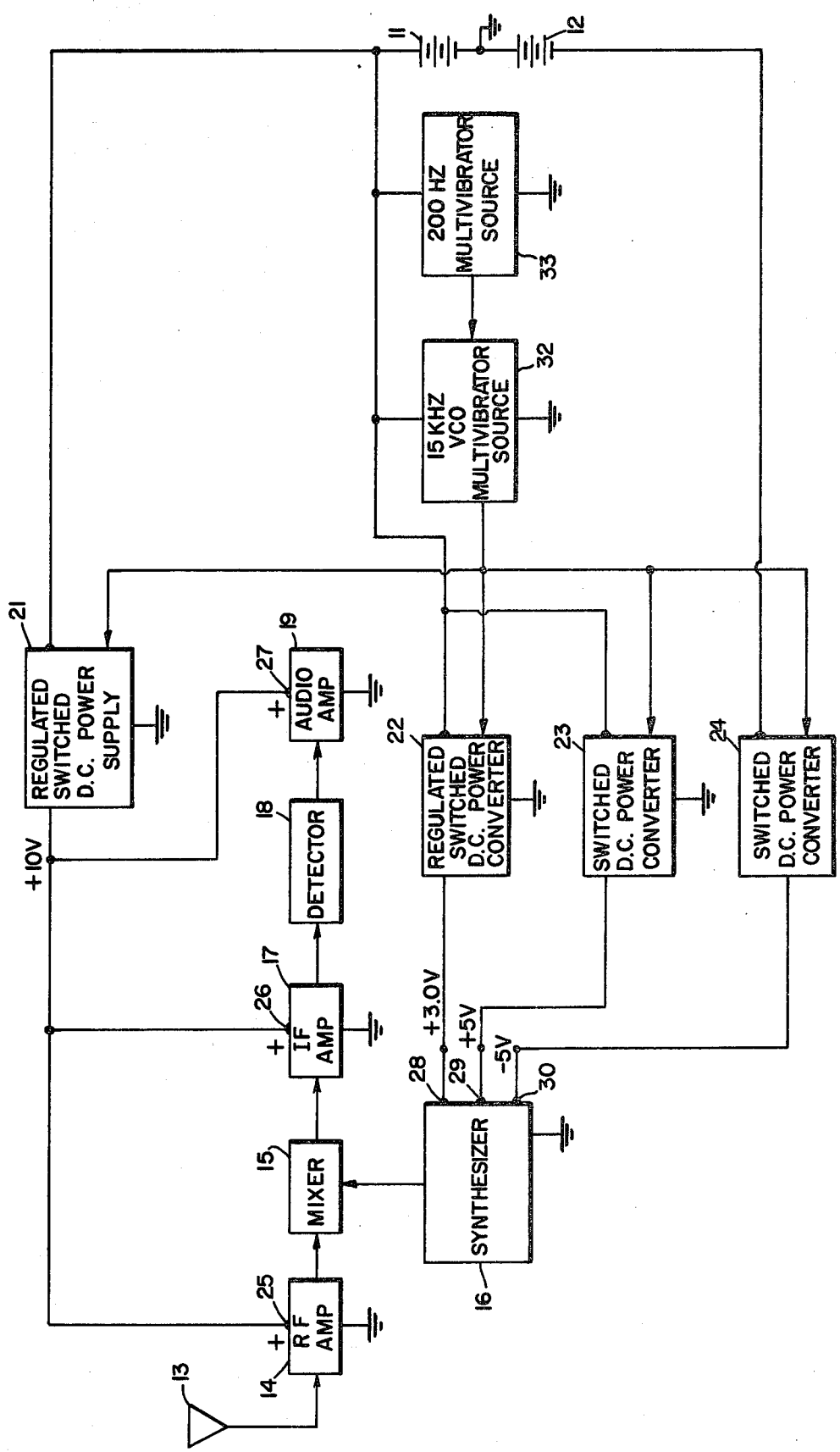
FIG. 1 is a block diagram of a radio receiver in accordance with the invention.

Reference is now made to FIG. 1 of the drawing wherein a portable radio receiver powered by positive and negative DC voltages derived from batteries 11 and 12 includes the usual components of an antenna 13 that supplies a signal to RF amplifier 14. Amplifier 14 feeds an amplified replica of the wave supplied to it by antenna 13 to mixer 15 that is also responsive to a heterodyning output of frequency synthesizer 16. Mixer 15 derives an IF beat frequency that is supplied to and amplified by IF amplifier 17, having a predetermined center frequency and bandwidth, typically 455 kHz±5 kHz. Amplifier 17 derives an IF output that is applied to detector 18, which can be either an AM, FM or PM detector, depending upon the type of modulation to which the receiver is adapted to respond. Detector 18 derives a relatively low, typically audio, frequency output that is applied to low frequency amplifier 19 that drives a suitable output transducer (not shown).

Typically, amplifiers 14, 17 and 19 include active elements, such as transistors, that require a +10 volt regulated DC power supply, while synthesizer 16 includes varactor diodes that are tuned by a +3.0 volt regulated supply. In addition, synthesizer 16 includes digital CMOS circuits requiring ±5 volt unregulated power supplies.

The DC power supplied to amplifiers 14, 17 and 19, as well as to synthesizer 16, is derived in the most efficient manner by employing switched DC power converters 21-24. Power converters 21-23 derive positive DC voltages in response to power supplied to them by the positive output electrode of battery 11. Converters 21 and 22 respectively derive regulated voltages at +10 volts and +3.0 volts; the +10 volt regulated output of converter 21 is applied in parallel to positive power supply terminals 25, 26 and 27 of amplifiers 14, 17 and 19, respectively, while the +3.0 volt output of converter 22 is applied to power supply terminal 28 of synthesizer 16. Converters 23 and 24 respectively derive +5 volt and −5 volt unregulted voltages that are supplied to power supply terminals 29 and 30 of synthesizer 16.

Each of converters 21-24 is a switched power supply, i.e., includes a transistor switch that is connected in series with an electrode of battery 11 or 12 and the power supply terminal of the component(s) powered by the converter. Each of converters 21-24 includes internal circuitry that has a tendency to drive its switching transistor at a frequency slightly less than 15 kHz. Each of converters 21 and 22 includes internal, regulating feedback circuitry that controls the duty cycle, i.e., relative on and off times, of its series transistor switch, in response to the DC load voltage at the converter output terminal. Because the digital circuitry of synthesizer 16 does not require accurately controlled DC power supply voltages, converters 23 and 24 are not regulated.

Because it is virtually impossible for converters 21-24 to have internal sources that activate the series switches thereof at identical frequencies, all of the power supplies are synchronously switched by a common multivibrator source 32, having a normal oscillation frequency slightly higher than the natural oscillation frequency of the converters, i.e., source 32 has a natural oscillation frequency of 15 kHz. The synchronizing source overcomes the tendency of converters 21-24 to switch at the oscillation frequencies of the internal circuits thereof. 15 kHz is selected as the common synchronizing frequency of source 32 for converters 21-24 because 15 kHz is beyond the bandpass frequency of audio amplifier 19 (typically having a bnadpass of between 100 Hz and 5 kHz), and the harmonics of 15 kHz are outside of the bandpass of IF amplifier 17; the 30th and 31st harmonics of source 32 are respectively 450 and 465 kHz, frequencies that are at or beyond the bandpass of IF amplifier 17. RF amplifier 14 typically has a bandpass of between 2 and 76 mHz. Significant interference effects are present only at the lower frequencies in this range; harmonics above the 500th introduced into terminal 25 have sufficiently low amplitude to preclude any interference with the RF signal being handled by amplifier 14. Similarly, the frequencies derived from synthesizer 28 are beyond the 500th harmonic of the switching frequency of power converters 22-25 and so that harmonics derived from converters 22-25 have virtually no effect on the output of the synthesizer.

Filters included in amplifiers 14, 17 and 19, as well as in mixer 15 and synthesizer 16 and converters 21-24, are designed to attenuate the 15 kHz switching frequency of the converter, as well as the harmonics thereof. In particular, each of the power supplies includes a resonant, trap filter, centered at 15 kHz. Amplifier 17 includes resonant trap filters at 450 and 465 kHz, while amplifier 19 includes a resonant, trap filter at 15 kHz.

By synchronizing the switching of power converters 21-24, so that all of the converters are simultaneously switched, any transients at the converter output terminals, which are coupled to amplifiers 14, 17 and 19, or synthesizer 16, do not cause intermodulation products because the transients supplied by the converters all occur at the same time. Of course, if one transient occurs in exact synchronism with another transient, there is a homodyning action that produces a DC component, as well as a component having twice the frequency of the transient. The DC component is not passed between the various amplifiers due to AC coupling between the various amplifiers and the synthesizer. The second harmonic of the transient is not coupled between the amplifiers due to the filtering circuits previously discussed.

To further minimize the effective interference between the outputs of converters 21-24, the 15 kHz output of source 32 is spread slightly by an audio frequency source, such as a 200 Hz multivibrator 33. Multivibrator 33 derives a 200 Hz output that is applied as a voltage control input to multivibrator 32. In response to the 200 Hz output of source 33, the 15 kHz signal derived from source 32 is frequency modulated to produce a band of frequencies centered about and having an average frequency of 15 kHz; there is a ±100 Hz deviation of the 15 kHz signal in response to source 32.

The frequency modulated output of source 32 is applied to converters 21-24 so that harmonics derived from the converters have noise-like characteristics spread over a relatively wide frequency band; thereby the energy content at the fundamental or the harmonics of converters 21-24 for any particular frequency is relatively low. Because the energy content at any particular frequency of the outputs of converters 21-24 is relatively low, there is less interference between the transients supplied by the converters to amplifiers 14, 17 and 19, as well as to synthesizer 16, so that there is a further lowering of interference superimposed by the transients of the switched converters on the signals processed by amplifiers 14, 17 and 19. For example, if it is assumed there is a 200 Hz deviation in the output of source 32 in response to the output of multivibrator 33, the 30th harmonic of the 15 kHz wave, at 450 kHz, is spread over a bandwidth of 6 kHz. Of course, it is to be understood that the deviation frequency of source 32 in response to the output of source 33 can be adjusted or tailored to the desired system requirements.

Figure 2:
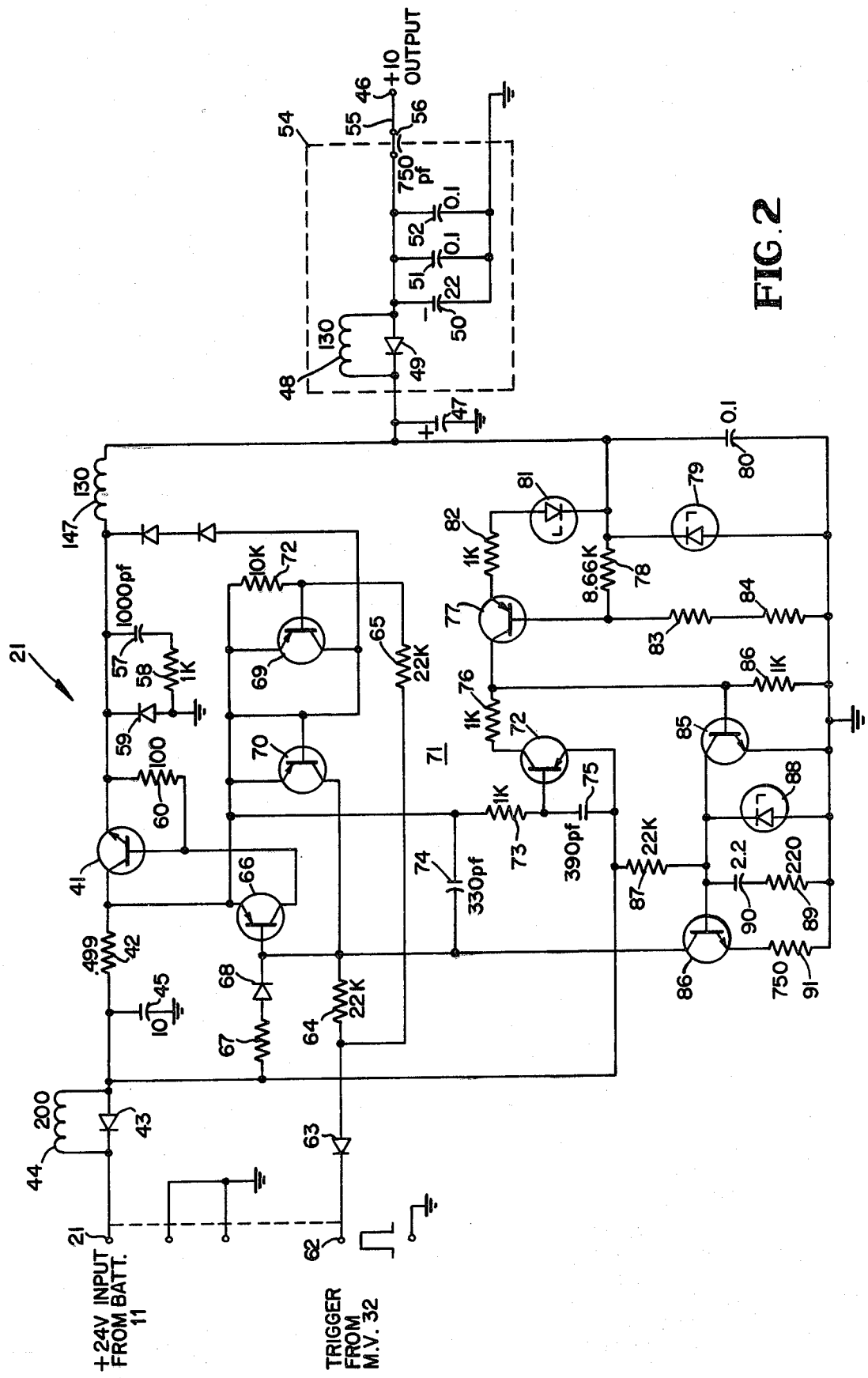
FIG. 2 is a circuit diagram of a preferred embodiment of a regulated, switched DC power converter employed in FIG. 1.

Reference is now made to FIG. 2 of the drawing wherein a preferred embodiment for regulated, switching power converter 21 is illustrated. Converter 21 includes a series, switching NPN transistor 41 having a collector connected through resistor 42 and the anode-cathode path of diode 43 that is shunted by inductor 44 to terminal 31, supplied with a 24 volt potential from the positive electrode of battery 11. (Preferred component values and semiconductor types are indicated on the drawing, with the values of resistors being given in ohms, the values of capacitors being given in microfarads, and the values of the inductors being given in millihenries; it is to be understood, however, that other appropriate component values and semiconductor types can be utilized.) The connection between the anode of diode 43 and resistor 42 is shunted to ground by capacitor 45; capacitor 42 and inductor 44 form a filter network for the DC voltage at terminal 31. The emitter of switching transistor 41 is connected to output terminal 46, at which a +10 volt potential is developed and supplied to terminals 25-27 of amplifiers 14, 17 and 19, respectively. The emitter of transistor 41 is connected to terminal 46 via series, filter inductors 47 and 48; the latter is shunted by back-biased protector diode 49. A junction between inductors 47 and 48 is shunted to ground through filter capacitor 49, while parallel output filter capacitors 50-52 are connected in shunt between terminal 46 and ground. To eliminate stray variations from inductor 48 and output filter capacitors 50-52, the inductor and output filter capacitors, as well as diode 49, are maintained in shielded box 54 through which lead 55 between capacitor 52 and terminal 46 extends, as indicated by capacitor 56. Shunting the connection between the emitter of transistor 41 and inductor 47 is a series circuit including filter capacitor 57 and resistor 58; the series circuit is shunted by transient suppressing back-biased diode 59. Stability for the base emitter bias for transistor 41 is established by resistor 60 that is connected between the base and emitter of the switching transistor.

Transistor 41 is switched into a conducting state in response to a positive going transition at the output of 15 kHz multivibrator source 32, as coupled to terminal 62 of converter 21. The positive going transition at terminal 62 is coupled through the cathode-anode path of forward biased transistor 62 to resistors 64 and 65, both of which are connected to the anode of diode 63. The pulse coupled through resistor 64 is supplied to the base of PNP transistor 66, which is normally back-biased by virtue of the connection of its base through the cathode-anode path of diode 68 and resistor 67 to the positive DC voltage maintained across capacitor 45. The positive going pulse supplied to resistor 65 is also fed to the emitter of transistor 66 via a boot strap network including NPN transistors 69 and 70. Transistor 69 is effectively connected in circuit as a forward biased diode because its emitter and collector are short circuited together to the positive DC voltage across capacitor 45, as coupled through resistor 42, and the connection of the transistor base to resistor 65, as well as through resistor 72 to the voltage at the junction between the collector of transistor 41 and resistor 42. The collector of transistor 66 is connected directly to the base of transistor 41, whereby transistor 41 is normally maintained in a cut-off condition while transistor 66 is back-biased. In response to transistor 66 being forward biased by the positive going transition at terminal 62, transistor 66 is activated into a conducting state, causing transistor 41 to be forward biased so that current passes from terminal 31 to terminal 46 through the emitter collector path of the power switching transistor 41.

The cut-off time of transistor 41 is dependent upon the load voltage across capacitor 49 to provide automatic regulation for the power requirements of amplifiers 14, 17 and 19. To this end, a feedback circuit 71 senses the voltage across capacitor 49 and develops a turn-off pulse for the base of transistor 66 subsequent to the leading edge of the pulse at terminal 62; the occurrence time of the turn-off pulse is dependent upon the voltage across capacitor 49.

Circuit 71 includes internal, free-running, relaxation oscillator circuitry tending to activate switching transistor 41 at a frequency slightly less than the frequency of multivibrator 33. Thereby, a failure of multivibrator 33 does not prevent operation of the entire receiver. The internal circuitry includes a timing network comprising NPN transistor 72 that is normally back-biased because its base is connected through resistor 73 to the positive DC voltage maintained across capacitor 45, as coupled through resistor 42. One terminal of resistor 73 is connected through series capacitor 74 to the junction between resistor 64 and the base of transistor 66; the other terminal of resistor 73 is connected to capacitor 75 that shunts the emitter base path of transistor 72. Transistor 72 is activated into a conducting state in response to the positive going transition from multivibrator 32, as coupled to the base of the transistor through diode 63, resistor 64, capacitor 74, and resistor 73. The positive going transition causes a sudden increase in the current flowing through resistor 73, causing transistor 72 to be forward biased.

The duration of the forward bias of transistor 72 is controlled by the DC voltage supplied to resistor 76, the collector load of transistor 72. The DC voltage supplied to resistor 76 is responsive to the voltage across capacitor 49, as coupled to the collector of common base NPN transistor 77 via biasing diode 81 and resistor 82 and the emitter collector path of the transistor. The voltage across capacitor 49 is coupled as a bias voltage to the base of transistor 77 via resistor 78. Opposite terminals of resistor 78 are shunted by a bias circuit including back-biased diode 79 that is shunted by capacitor 80 and series resistors 83 and 84, having values selected in accordance with the nature of the load connected to terminal 46.

Transitions in the state of transistor 72 are coupled to the base of transistor 66 via cascaded NPN transistors 85 and 86. To this end, the voltage developed between resistor 76 and the collector of transistor 77 is directly coupled to the base of normally forward biased transistor 85, the emitter base junction of which is shunted by biasing resistor 186. The collector of transistor 85 is biased by the DC voltage across capacitor 45, as coupled to the collector by resistor 87, that also normally supplies a reverse bias voltage for the base of transistor 86. The emitter base path of transistor 86 is also biased by back-biased diode 88 that is shunted by the series combination of resistor 89 and capacitor 90; the emitter of transistor 86 is connected to ground by resistor 91, as are the branches including diode 88, resistor 89, and capacitor 90. The collector of transistor 86 is directly connected to the base of transistor 66.

In normal operation, transistor 85 is forward biased to cut off transistors 86 and 41. In response to the positive going transition at terminal 62, transistors 41, 66, 72, 85 and 86 change state so that transistors 41, 66, 72 and 86 become forward biased while transistor 85 is reverse biased. The transistors remain in the state until the voltage at the junction between resistor 76 and the collector of transistor 77 increases to a predetermined value, causing transistor 85 to become forward biased, whereby transistors 86, 66 and 41 are reverse biased. The time at which transistor 85 is again biased into the forward bias state is determined by the voltage across capacitor 49.

It is thereby seen that the switching time of transistor 41 is governed by the voltage developed across capacitor 49. The values of the filtering components for the switching transients of transistor 41, viz.: inductors 44, 47 and 48, and capacitors 45, 49, 50-52 and 57, are selected to suppress the 15 kHz switching transients of transistor 41, as well as to provide optimum smoothing for the DC voltage supplied to terminal 46. Thereby, there is a minimum amount of coupling of the transients to amplifiers 14, 17 and 19 to minimize noise introduced by the very efficient, switched power converter into the RF, IF and audio signals received, amplified and processed by the receiver.

While there has been described and illustrated one specific embodiment of the invention, it will be clear that variations in the details of the embodiments specifically illustrated and described may be made without departing from the true spirit and scope of the invention as defined in the appended claims.

What is claimed is:

1. A portable radio receiver adapted to be powered by a battery comprising an IF amplifier having a predetermined center frequency and bandpass, circuit means for supplying signals to and responsive to signals derived from the amplifier, a first switching power converter powered by the battery for deriving a first DC power supply voltage that powers a load including the IF amplifier, a second switching power converter powered by the battery for deriving a second DC power supply voltage that powers another load including at least some of the circuit means, a source powered by the battery for synchronizing the switching of said first and second power supplies at the same time, said synchronizing source having a fundamental and harmonics with substantial amplitude outside of the passband of the circuit means powered by the second power supply and the bandpass of the IF amplifier to minimize spurious signals injected by the power converters into the amplifier and circuit means.

2. The receiver of claim 1 wherein the synchronizing source derives a wave having a frequency spread over a predetermined spectrum so that harmonics of the wave have noise-like characteristics spread over relatively wide frequency ranges.

3. The receiver of claim 2 wherein the synchronizing source includes a fixed frequency source and means for FM modulating the fixed frequency source.

4. The receiver of claim 2 wherein the synchronizing source includes a fixed frequency source and an audio frequency source for FM modulating the fixed frequency source.

5. The receiver of claim 4 wherein each power converter includes means for controlling the duration the battery is coupled to the load of the converter in response to the load of the converter.

6. The receiver of claim 5 wherein each converter includes means for normally switching itself at a frequency slightly less than the frequency it is switched by the source.

7. The receiver of claim 2 wherein each converter includes means for controlling the duration the battery is coupled to the load of the converter is response to the load of the converter.

8. The receiver of claim 2 wherein each converter includes means for normally switching itself at a frequency slightly less than the frequency it is switched by the source.

9. The receiver of claim 1 wherein each power converter includes means for controlling the time the battery is coupled to the load of the converter in response to the load of the converter.

10. The receiver of claim 1 wherein each converter includes means for normally switching itself at a frequency slightly less than the frequency it is switched by the source.

11. The receiver of claim 1 wherein the circuit means includes a frequency synthesizer for deriving a heterodyning wave, said synthesizer being powered by the second power converter.

12. The receiver of claim 11, wherein the circuit means includes a low frequency amplifier, said low frequency amplifier being powered by the first power converter.

13. A portable radio receiver adapted to be powered by a battery comprising an RF amplifier, frequency synthesizer for deriving a heterodyning wave, a mixer responsive to a signal derived from the RF amplifier and the heterodyning wave for deriving an IF signal, an IF amplifier responsive to the IF signal, said IF amplifier having a predetermined bandwidth, a detector responsive to a signal derived from the IF amplifier, a low frequency amplifier responsive to a signal derived from the detector, said low frequency amplifier having a predetermined bandpass, first, second and third switching power converters powered by the battery for deriving first, second and third DC power supply voltages that are respectively applied as power supply voltages to (1) said IF, RF and AF amplifiers, (2) one portion of the synthesizer, and (3) a second portion of the synthesizer, a source for synchronizing the switching of said first, second and third power converters at the same time, said synchronizing source having a fundamental and harmonics outside of the bandpass and bandwidth to minimize spurious signals injected by the power converters into the amplifiers.

14. The receiver of claim 13 wherein the synchronizing source derives a wave having a frequency spread over a predetermined spectrum so that harmonics of the wave have noise-like characteristics spread over relatively wide frequency ranges.

15. The receiver of claim 14 wherein the synchronizing source includes a fixed frequency source and means for FM modulating the fixed frequency source.

16. The receiver of claim 14 wherein the synchronizing source includes a fixed frequency source and an audio frequency source for FM modulating the fixed frequency source.

17. A portable radio receiver adapted to be powered by a battery comprising an IF amplifier having a predetermined center frequency and bandwidth, circuit means for supplying signals to and responsive to signals derived from the amplifier, a switching power converter powered by the battery for deriving a DC power supply voltage that powers the IF amplifier and at least some of the circuit means, means for deriving a wave having a predetermined average frequency and components spread over a predetermined frequency spectrum so that harmonics of the wave have noise-like characteristics spread over relatively wide frequency ranges, and means for controlling the switching of the converter in response to the wave so that the converter is switched in synchronism with variations of the wave.

18. The receiver of claim 17 wherein the wave deriving means includes a fixed frequency source and an audio frequency source for FM modulating the fixed frequency source.

* * * * *